March 23, 1937.     C. OPOLO     2,074,419
PLANTER MACHINE HITCH TO TRACTORS
Filed June 9, 1936     2 Sheets-Sheet 2
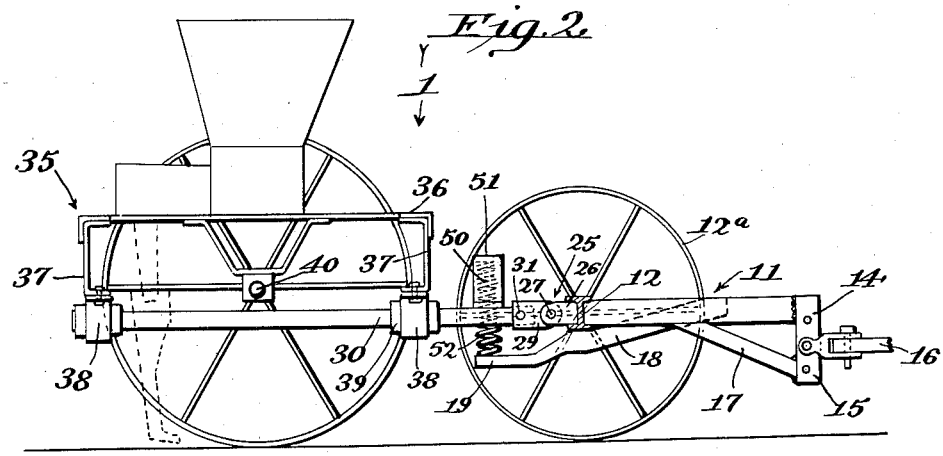
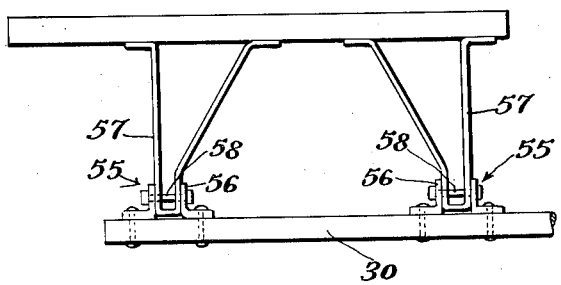
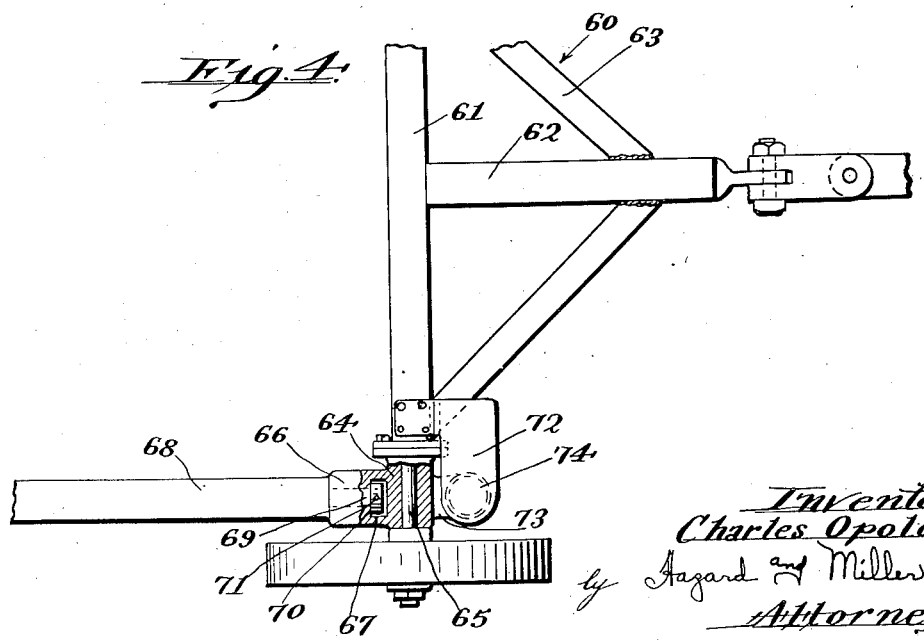
Inventor:
Charles Opolo.
by Hazard and Miller
Attorneys.

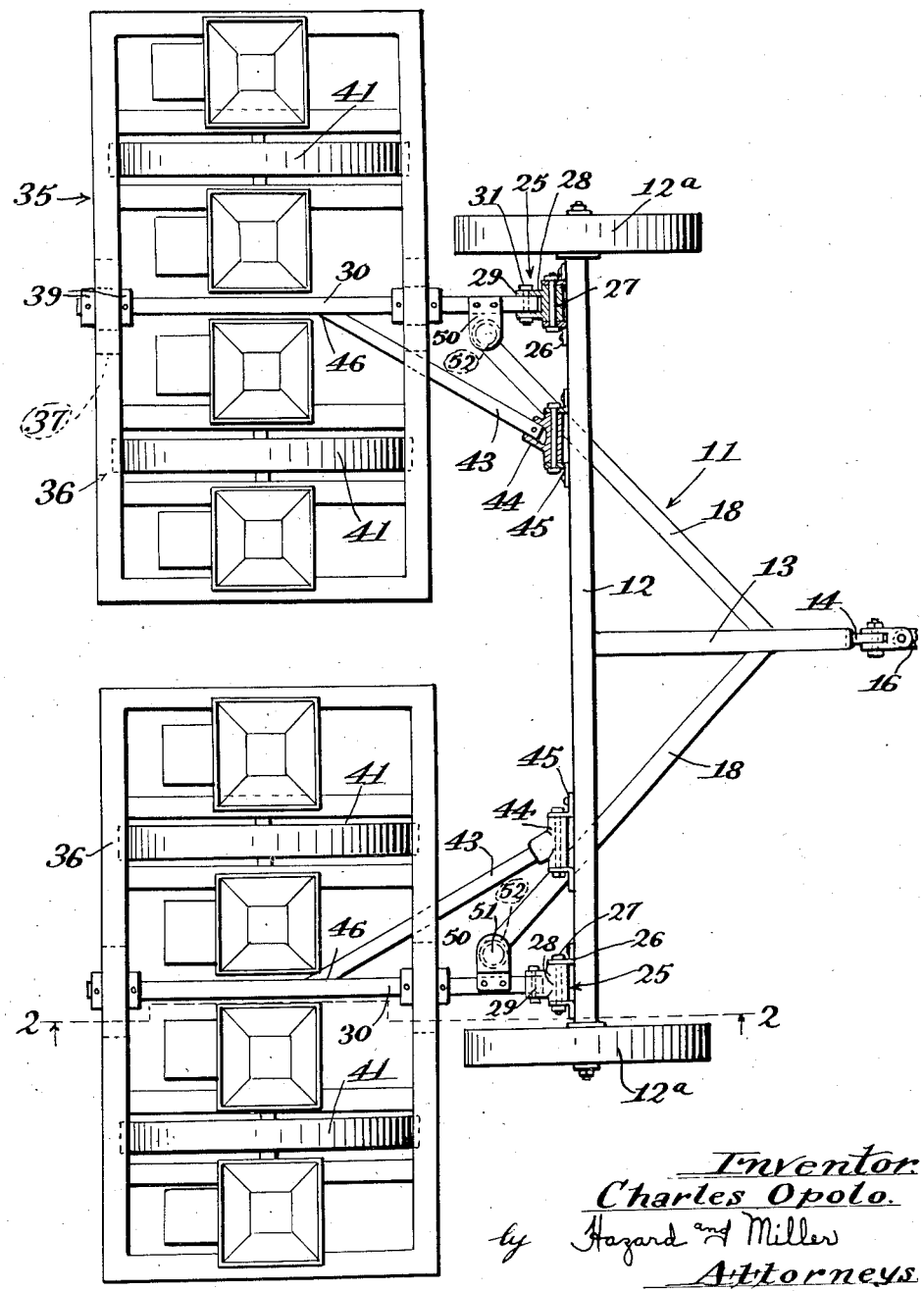

Patented Mar. 23, 1937

2,074,419

UNITED STATES PATENT OFFICE 2,074,419

PLANTER MACHINE HITCH TO TRACTORS

Charles Opolo, Culver City, Calif.

Application June 9, 1936, Serial No. 84,281

17 Claims. (Cl. 97—235)

My invention relates to structures for forming a hitch or pulling connection between farm tractors, usually of the endless track type, to planter machines, drills, seeders and the like, with but minor changes in the planter.

In the present type of hitch or connection between planters of various types and the pulling tractors, it is difficult to have the planter insert and drop the seed at a uniform depth below the surface of the soil, especially where the field is not level but may have humps here and there which cause either one end or the other of the planter to tilt up or down. Therefore, a main object and feature of my invention is in the employment of a comparatively light weight two wheel truck which is towed directly behind the tractor and this truck provides connections to the planter providing for a trailing up and down movement of the planter in reference to the small pilot truck and also for a lateral tilting motion. Another feature of my invention provides for towing a plurality of separate planter machine units behind a single pilot truck.

Considered in more detail, an object and feature of my invention is providing a tow-bar connected to the pilot truck with a horizontal pivotal connection so that this bar may tilt up and down but is restricted from sidewise movement. The tow-bar is connected to the longitudinal center of a planter machine unit, which unit has a pivotal connection to the tow-bar, the pivot extending longitudinally to allow for a lateral tilt of the planter unit, this unit being supported on its own wheels, usually two, with a single axle. Thus the planter unit may move up and down relative to the pilot truck and also tilt laterally with one wheel higher than the other and vice versa. A further detail feature of my invention is in using angle-braces between the pilot truck and the main tow-bar for each planter machine, giving additional stiffness to the tow-bar to cause it to pull the planter machine to directly follow the pilot truck, such brace having a pivotal connection to the pilot truck. Another detail feature is employing a spring interposed between a portion of the pilot truck and the tow-bar to reduce the upward tilt of the forward part of the tow-bar due to the weight of an operator riding on the planter machine.

My invention is illustrated in the accompanying drawings, in which:

Fig. 1 is a plan taken in the direction of the arrow 1, showing two planter machines towed from the pilot truck, this latter being pulled by a truck or the like. The planter machines are illustrated somewhat in a diagrammatic manner.

Fig. 2 is a longitudinal section taken substantially on the line 2—2 of Fig. 1 in the direction of the arrows, portions of the planter machine being indicated in dotted lines.

Fig. 3 is a partial longitudinal section similar to Fig. 2 showing an alternative hinged connection of the planter machine to the tow-bar.

Fig. 4 is a plan showing a modified swivel connection of the tow-bar to the pilot truck.

Referring first to the construction of Figs. 1 and 2, I employ a pilot truck designated by the numeral 11. This has an axle 12 with wheels 12a thereon. Connected to the axle there is a central draw bar 13, preferably horizontal, that is, at the same height above the ground as the axle. This has a forward drop section 14 and a lower end 15, the forward end of which is arranged for the connection of a draw link 16, this providing for vertical and horizontal swivel in the usual manner. An angle brace 17 connects the lower section 15 and the main or upper part of the draw bar 13.

Diagonal braces 18 are connected to the draw bar 13, preferably the upper section, and pass downwardly underneath the axle 12, being preferably welded to the under side of the axle, and continue diagonally, forming a spring seat 19. This spring seat is located rearwardly of the axle 12.

A horizontal pivoting draw hinge designated by the numeral 25 is constructed by having angle brackets 26 secured to the rear side of the axle 12, which axle is preferably an I-beam. A pintle pin 27 extends between these angle brackets and has a hub 28 fitting between the angle brackets and swinging thus on the horizontal pintle 27. A socket structure 29 is formed integral with the hub and to this is connected a tow-bar 30, there being an attaching pin 31 securing the forward end of the tow-bar in the socket 29. Thus, the tow-bar is connected for an up and down movement relative to the pilot truck.

The planter machine designated by the assembly numeral 35 has a frame structure 36 including depending channels 37 at the front and the rear portion, which channels are connected to longitudinal hubs 38 which are rotatably mounted on the draw bar 39, this bar having cylindrical sections with collars 39 attached thereto by set screws or the like confining the hubs 38. The planter machine has its own central axle 40 with two wheels 41. The tow-bar 30 is located centrally between the wheels and preferably below the axle 40. This allows the planter machine to tilt on the tow-bar 30 so that, for instance, one wheel may be relatively high and the other low in passing over uneven ground. Also, the whole planter machine may be tilted up and down on the horizontal pintle 27. In this construction the tow-bar is held from rotation in the socket 29. If desired, an angle brace 43 may be connected at its forward end to a swivel hub 44 mounted between pivot angle brackets 45 of the same type as the angle brackets 26. The rear end 46 of the angle bracket is attached to the tow-bar 30. Thus, the angle bracket and tow-bar pivot up and down with their pintle pins in alignment and as the diagonal brace 43 passes underneath the channel frame 37 and is quite close to the hub 38 there is sufficient room for the lateral tilting of the planter machines.

A bracket 50 is attached to the tow-bar 39 forward of the planter machine. This extends upwardly and has an upper spring seat 51 offset to one side of the tow-bar so that a coil spring 52 may fit between the upper spring seat 51 rigidly connected to the tow-bar 30 and the spring seat 19 rigidly connected to the pilot truck. This spring gives a certain resiliency to the connection of the planter machine to the pilot truck and tends to restrict a pumping up and down action should the various pivots and pintle pins become worn.

It will be noted in Fig. 1 that I have shown two planter machines towed behind the pilot truck but it is obvious that the pilot truck may be designed to tow as many planter machines as would be practical. In most planting the planter boots and the hoppers are spaced regular distances apart according to the crops to be sown. Hence, it is desirable that the two end hoppers of adjacent planter machines be usually the same distance apart as the hoppers in one machine are spaced apart in such machine.

It will be understood that the double swivel or hinging connection to a pilot truck and from a pilot truck to a tractor is suitable for many types of farm instruments, such as bean cultivators and cutters and other types of seed machines.

In the modified construction of Fig. 3, instead of having hubs 38 on the tow-bar 30 this tow-bar is provided with a pivot 55 which is formed with ears 56 being of an angular type and riveted to the tow-bar, which in this case does not need to be cylindrical, and braces 57 rigidly connected to the frame of the planter machine are connected by longitudinal pintle pins 58 to the ears 56, thus forming the longitudinal hinged or pivotal connection 55. This construction allows the planter machine to tilt or hinge for sidewise inclination on the tow-bar 30.

In the construction of Fig. 4 the pilot truck designated by the assembly numeral 60 is slightly modified. It, however, has an axle 61, a draw bar 62, and angle braces 63. A substantial hub 64 is on the axle ends 65. This has a socket structure 66 terminating in a vertical slot 67. The tow-bar 68 has a cylindrical forward end 69 fitting in the socket 66 and during insertion a head in the form of a collar 70 inserted in the slot 67 is fitted to the end of the cylindrical part 69 and secured by a set screw 71 or the like. It will therefore be seen that the hub may tilt on the horizontal axis of the axle section 65 and that the tow-bar may rotate on the longitudinal axis of the socket 66. In this case the frame of the planter machine may be rigidly secured to the tow-bar 68.

In this construction a spring seat base 72 is secured to the axle section 61 extending preferably upwardly therefrom and the hub has a forward extension 73 forming a lower spring seat so that the coil spring 74 is located between a lower spring seat connected to the hub and thus operating with the planter machine and the upper spring seat 72, which is formed rigid with the pilot truck.

Various changes may be made in the details of the construction without departing from the spirit or scope of the invention as defined by the appended claims.

I claim:

1. In a device as described, a planter machine having a frame with wheels, a longitudinally extending tow-bar between the wheels, a pivoting connection between the tow-bar and the frame whereby the frame may tilt laterally on the tow-bar during a transverse inclination of the frame, a towing device, a connection between the forward end of the tow-bar and the towing device having a transverse hinge whereby the planter machine may lift and lower relative to the towing device.

2. In a device as described, the combination of a planter machine having a frame with two wheels, a tow-bar positioned midway between the wheels, the axles of the wheels being transverse to the tow-bar and the wheels being equidistant from the tow-bar, a pivotal connection between the tow-bar and the frame whereby the planter machine may tilt laterally due to one wheel being higher than the other relative to the tow-bar, a pilot truck having a connection for pulling the same, a hinged connection between the pilot truck and the tow-bar, such hinge being transverse whereby the tow-bar may swivel up and down in an arc so that the tow-bar may move in a vertical arc in reference to the pilot truck.

3. In a device as described, the combination of a pilot truck having a connection for pulling same, a planter machine having a frame with wheels, a tow-bar, a connection between the tow-bar and the frame and tow-bar connections providing for a movement of the tow-bar in a vertical plane and a tilting movement of the planter machine frame relative to the pilot truck.

4. In a device as described, the combination of a pilot truck having an axle with wheels on opposite ends thereof, a connection to said axle for the towing of the pilot truck, a planter machine having a frame with two wheels, a tow-bar connected to the frame between the wheels of the frame, a tow-bar connection to the axle of the pilot truck for a vertical movement of the tow-bar and planter machine relative to the pilot truck and a lateral tilting movement of the planter machine relative to the pilot truck.

5. In a device as claimed in claim 4, the connection of the tow-bar to the axle comprising a transverse hinge connection and a longitudinal swivel connection whereby the tow-bar has a combined vertical movement and rotation on its axis.

6. In a device as described, the combination of a pilot truck having a connection for towing the same, a planter machine, a transversely pivoted towing connection between the planter machine and a pilot truck providing for an up and down movement of the planter machine and a lateral tilting movement of the planter machine relative to the pilot truck, the planter machine having two wheels spaced apart transversely and the towing connection being attached to the planter machine midway between the said wheels.

7. In a device as described, the combination of a pilot truck having an axle with wheels at opposite ends, a towing connection for the truck connected to the axle, a planter machine having a frame with two wheels spaced apart transversely, a towing connection between the axle of the pilot truck and the frame of the machine with means providing for an up and down and a lateral tilting motion of the planter machine in reference to the axle of the pilot truck.

8. In a device as claimed in claim 7, the said towing connection having a spring seat and a complementary spring seat connected to the pilot truck and a spring between said seats.

9. In a device as described, the combination of a pilot truck having an axle with wheels at opposite ends, a towing connection for the truck connected to the axle, a planter machine having a frame with two wheels spaced apart transversely, a tow-bar hinged to the axle with a transverse hinge and a pivotal connection between the tow-bar and the frame of the planter machine located midway between the wheels of the machine for lateral tilting of said machine.

10. In a device as claimed in claim 9, the pivotal connection to the tow-bar comprising hubs rotatably mounted on said tow-bar and having a rigid connection to the frame of the machine.

11. In a device as claimed in claim 9, the pivotal connection to the tow-bar comprising pivot brackets rigidly connected to the tow-bar and a pivotal connection between said brackets and the frame of the machine.

12. In a device as claimed in claim 9, a diagonal brace rigidly connected to the tow-bar and having a hinged connection to the axle of the pilot truck, the hinge being transverse and in alignment with the hinge connecting the tow-bar to the same axle.

13. In a device as claimed in claim 9, the tow-bar having a spring seat connected thereto, a pilot truck having a diagonal brace secured to the axle of the pilot truck and extending below the tow-bar and provided with a complementary spring seat at the rear end thereof and a spring between the said seats.

14. In a device as described, the combination of a pilot truck having an axle with wheels on the ends thereof, a draw-bar connected to the axle with means for pulling the truck, a planter machine having two wheels spaced apart, a tow-bar having a transverse hinged connection to the said axle, means forming a longitudinal pivotal connection between the tow-bar and the machine frame, such connection being midway between the wheels of the machine, the tow-bar having a spring seat positioned above said bar, a diagonal brace from the draw-bar to the truck axle and extending downwardly towards the tow-bar and having a complementary spring seat at its rear end and a spring between said seats.

15. In a device as claimed in claim 14, a diagonal brace having its rear end connected to the tow-bar and having a transverse hinged connection to the axle of the pilot truck in alignment with the hinge connecting the tow-bar to the axle of the pilot truck.

16. In a device as described, the combination of a pilot truck having an axle with wheels at the opposite ends thereof, a hub rotatably mounted on the axle, a tow-bar connected to the hub and a planter machine connected to the tow-bar, the said tow-bar having an up and down movement relative to the axle of the pilot truck.

17. In a device as claimed in claim 16, the said hub having a socket structure with a vertical slot at the base of the socket, the tow-bar having a cylindrical end fitting in the socket and having a head thereon, the head fitting in the said vertical slot.

CHARLES OPOLO.